(12) United States Patent  (10) Patent No.: US 8,425,164 B2
Gerber  (45) Date of Patent: Apr. 23, 2013

(54) METHOD AND DEVICE FOR BALANCING A TOOL COUPLING

(75) Inventor: Ernst Gerber, Reigoldswil (CH)

(73) Assignee: Rego-Fix AG, Tenniken (CH)

( * ) Notice: Subject to any disclaimer, the term of this patent is extended or adjusted under 35 U.S.C. 154(b) by 411 days.

(21) Appl. No.: 12/515,982

(22) PCT Filed: Dec. 3, 2007

(86) PCT No.: PCT/CH2007/000608
§ 371 (c)(1),
(2), (4) Date: May 22, 2009

(87) PCT Pub. No.: WO2008/067683
PCT Pub. Date: Jun. 12, 2008

(65) Prior Publication Data
US 2010/0061822 A1  Mar. 11, 2010

(30) Foreign Application Priority Data
Dec. 6, 2006 (CH) ........................ 1979/06

(51) Int. Cl.
*B23B 31/00* (2006.01)
(52) U.S. Cl.
USPC ............ 409/131; 408/143; 408/238; 409/234
(58) Field of Classification Search .................. 409/141, 409/232, 234, 131; 408/143, 238
See application file for complete search history.

(56) References Cited

U.S. PATENT DOCUMENTS

| 4,955,767 | A | * | 9/1990 | Kaiser et al. | 408/146 |
| 5,074,723 | A |   | 12/1991 | Massa et al. | |
| 5,116,194 | A | * | 5/1992 | Pfalzgraf et al. | 408/181 |
| 5,407,308 | A | * | 4/1995 | Takayoshi | 409/232 |
| 5,810,527 | A | * | 9/1998 | Jager et al. | 409/141 |
| 6,045,308 | A | * | 4/2000 | Frank et al. | 409/234 |
| 6,135,684 | A | * | 10/2000 | Senzaki | 409/234 |
| 6,364,581 | B2 | * | 4/2002 | Dyer et al. | 409/131 |
| 6,557,445 | B1 | * | 5/2003 | Ishikawa | 82/158 |
| 6,810,733 | B2 | * | 11/2004 | Fischer | 73/462 |
| 7,338,419 | B2 | * | 3/2008 | Storch et al. | 483/9 |
| 2003/0033873 | A1 |  | 2/2003 | Fischer | |

FOREIGN PATENT DOCUMENTS

| DE | 29809653 U1 |   | 9/1998 |
| DE | 19920699 C2 |   | 12/2000 |
| JP | 49054879 U | * | 12/1976 |
| JP | 64002813 A | * | 1/1989 |
| JP | 05177495 A | * | 7/1993 |
| JP | 11028633 A | * | 2/1999 |
| JP | 11104931 A | * | 4/1999 |
| JP | 2000042857 A | * | 2/2000 |

(Continued)

OTHER PUBLICATIONS

JPO website machine translation of JP 11-104931, printed on Aug. 26, 2011, 7 pages.*

*Primary Examiner* — Daniel Howell
(74) *Attorney, Agent, or Firm* — Hammer & Associates, P.C.

(57) ABSTRACT

For balancing a tool coupling, the compensating measures (removal of material, use of other material) are carried out in two planes an axial distance apart. Tool couplings are provided with recesses for imbalance compensation in two planes an axial distance apart.

4 Claims, 8 Drawing Sheets

FOREIGN PATENT DOCUMENTS

| | | | | |
|---|---|---|---|---|
| JP | 2000084783 A | * | 3/2000 | |
| JP | 2002066855 A | * | 3/2002 | |
| JP | 2004009244 A | * | 1/2004 | |
| JP | 2005305600 A | * | 11/2005 | |
| JP | 2005329509 A | * | 12/2005 | |
| WO | WO 98/31494 A1 | | 7/1998 | |

* cited by examiner

METHOD AND DEVICE FOR BALANCING A TOOL COUPLING

The invention relates to a method for balancing a tool coupling, and tool couplings balanced by means of this method.

By the use of increasingly more efficient cutting materials, higher and higher speeds (currently already 50 000 rpm or more) are becoming possible in the case of machine tools. With higher speeds, the adverse effects of imbalance increase. Such effects are shortening of the lifetime of the bearings of the machine spindles due to nonuniform loading, reduced surface quality of the workpiece processed and shorter service life of the cutting tools.

This problem and measures for overcoming it have long been known. Thus, for example, it is customary to provide bores on the outside of the tool coupling for compensating the imbalance. EP 1 007 256 describes a tool carrier in which compensating bores are provided in the radial area arranged in the interior of the coupling.

Another solution consists in the use of eccentric discs or compensating rings, as shown, for example, in DE 298 09 653 U1 or WO 90/11862.

If a measure for compensating imbalance (removal of material, use of other materials) is taken at an axial distance from the point which causes the imbalance, the imbalance is statically compensated but the dynamic imbalance dependent on the speed increases with increasing speeds. Recent known measures for compensating imbalance therefore envisage removal of material in or near the plane in which the imbalance occurs, in order also to compensate the dynamic imbalance.

However, it has now been found that this measure, too, is not sufficient for effectively eliminating the dynamic imbalance at very high speeds. It is therefore the object of the invention further to improve the compensation of imbalance in the case of tool couplings.

This is achieved, according to the invention, by taking measures for imbalance compensation in two planes an axial distance apart.

Below, preferred working examples of the invention are described with reference to the attached drawings.

Figure 1:
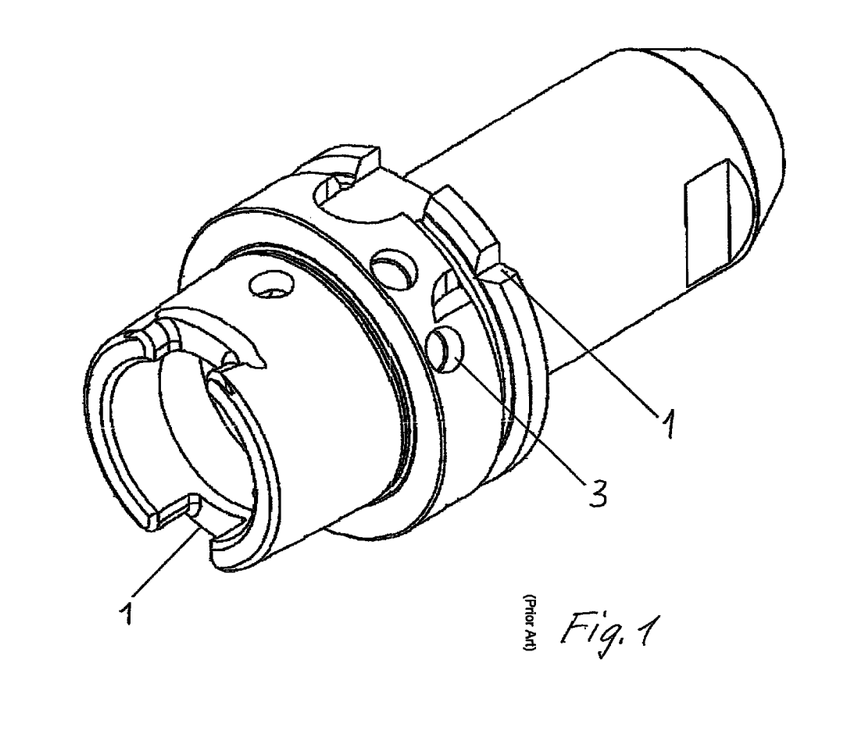
FIGS. 1 and 2 show perspective diagrams of hollow shank taper (HSK) tool couplings according to the prior art
Figure 2:
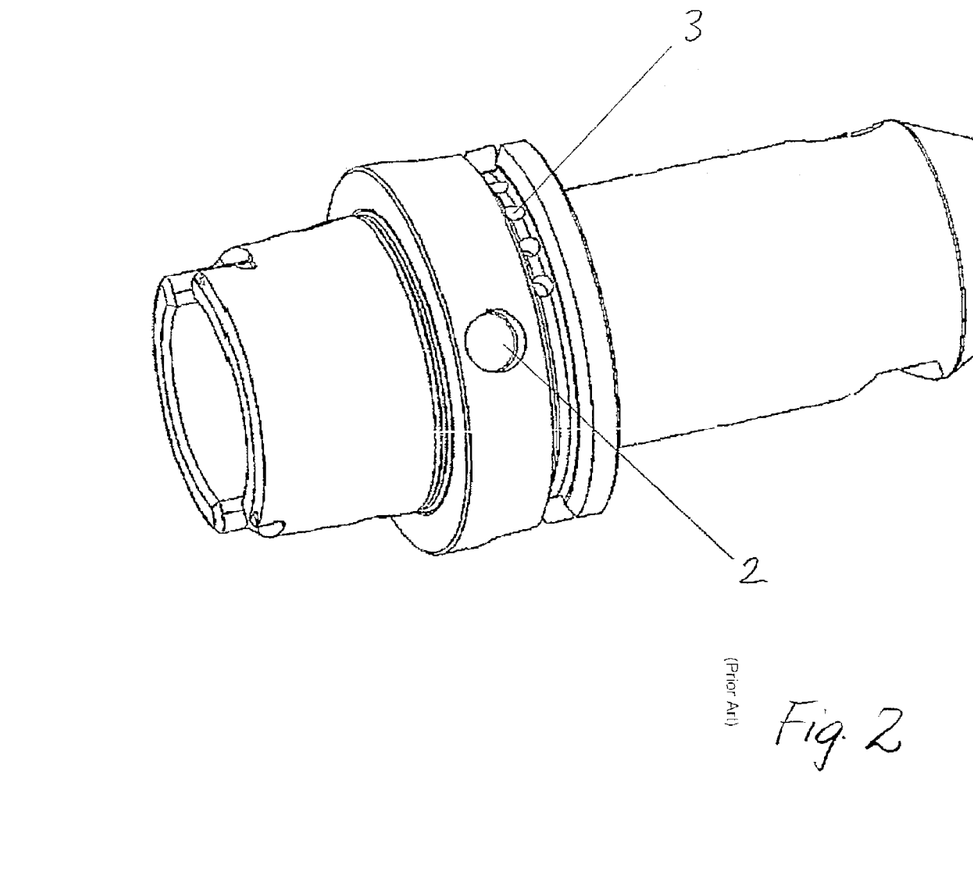

This method of compensating imbalance compensates the static imbalance but not the dynamic imbalance which leads to a tumbling movement of the tool coupling at relatively high speeds.

In the case of the hollow shank tapers shown in FIG. 3-8, the most frequent originators of the imbalance are shown, namely the two recesses 4 opposite one another and located in the end face 9 of the tool coupling for connection to the machine spindle and transmission of the drive torque, and positioning grooves 5 and a bore provided in the opposite side, i.e. not visible in the figure and intended for a chip (electronic data acquisition) in the flange 7 connecting to the taper surface 6.

Figure 3:
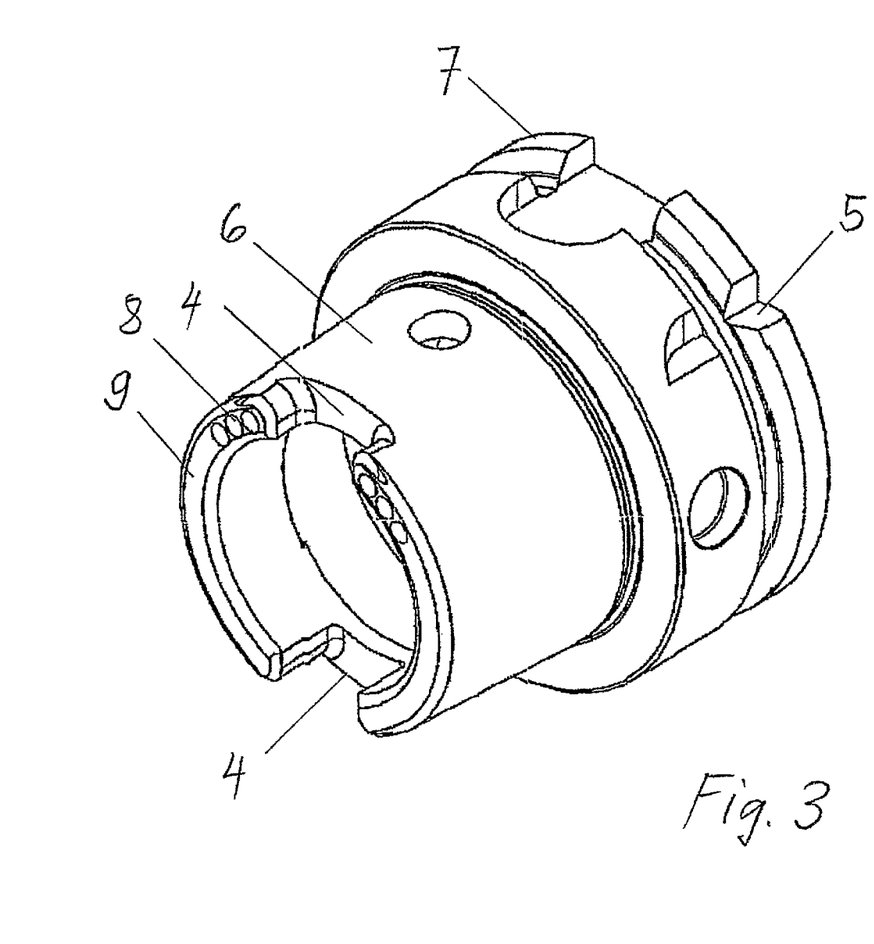
FIG. 3-8 show various embodiments of hollow shank tapers of tool couplings according to the invention The hollow shank taper (HSK) tool coupling shown in FIG. 1 has the known recesses, i.e. notches 1, bores 2, etc, which are required for gripping, positioning, etc, for example in the case of automatic tool change. These recesses are as a rule differently dimensioned on opposite sides and therefore produce imbalance. For compensating this imbalance, it is usual to remove material, generally in the form of bores 3, as far as possible in the vicinity of the producer of the imbalance.

In the version shown in FIG. 3, the imbalance at the end face, which is due to the recesses 4, is compensated by bores 8 in the end face 9 of the tool coupling, i.e. in the axial plane of the imbalance generation. The recesses present in the flange 7 are likewise compensated in the same axial plane of the imbalance generation, i.e. by bores.

Figure 4:
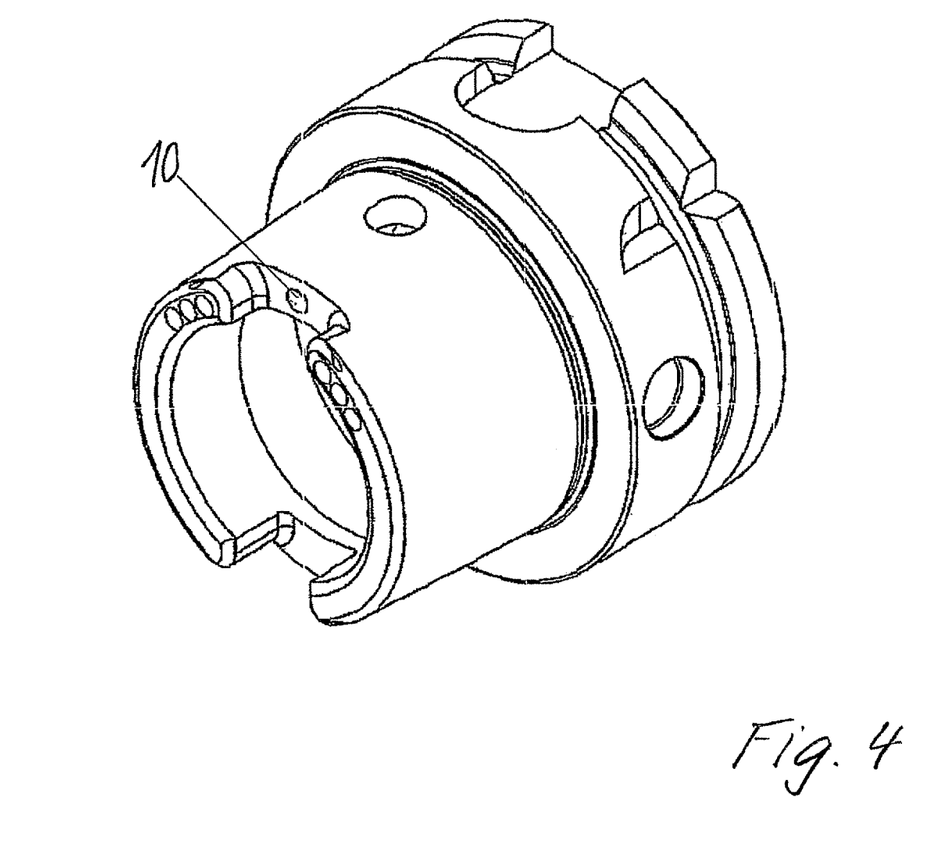

In the version shown in FIG. 4, additional compensation bores 10 are arranged in the recesses 4 themselves.

Figure 5:
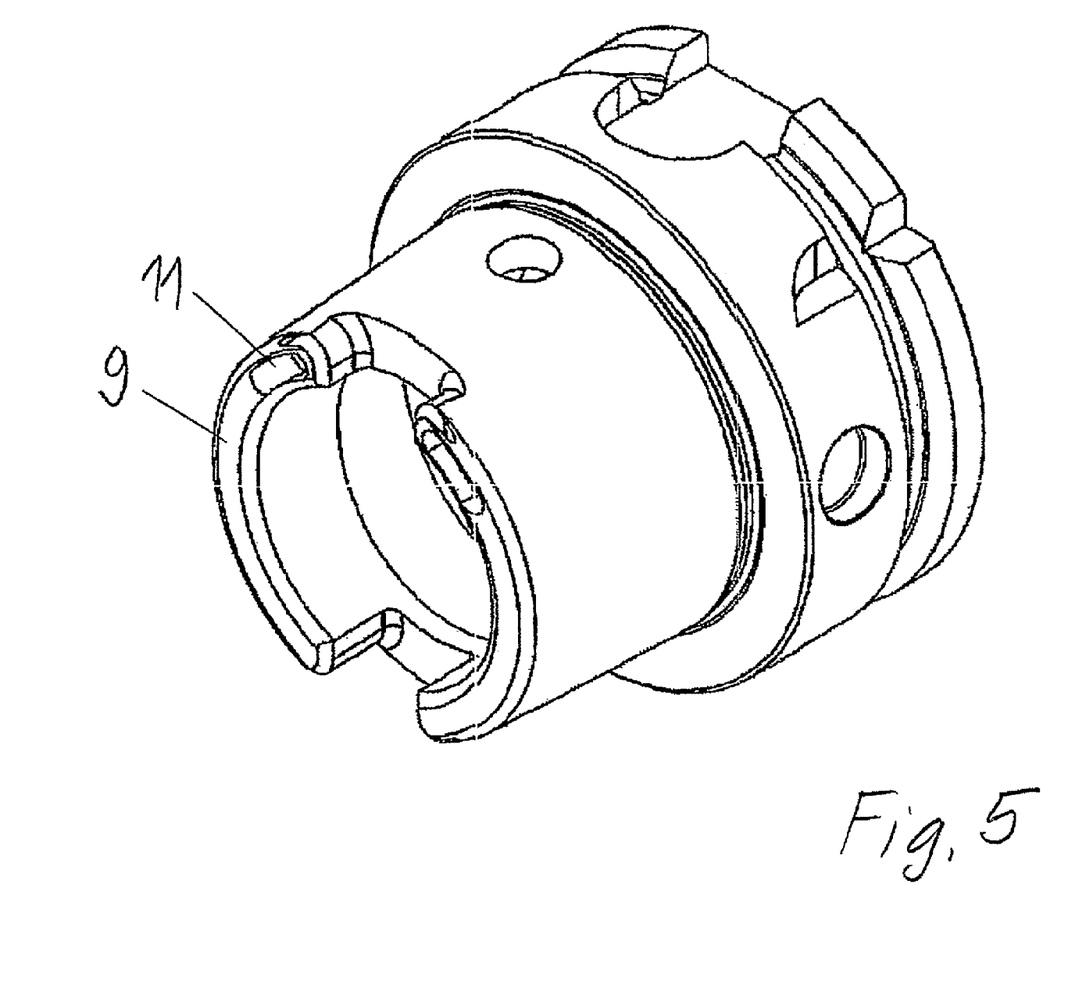
Figure 6:
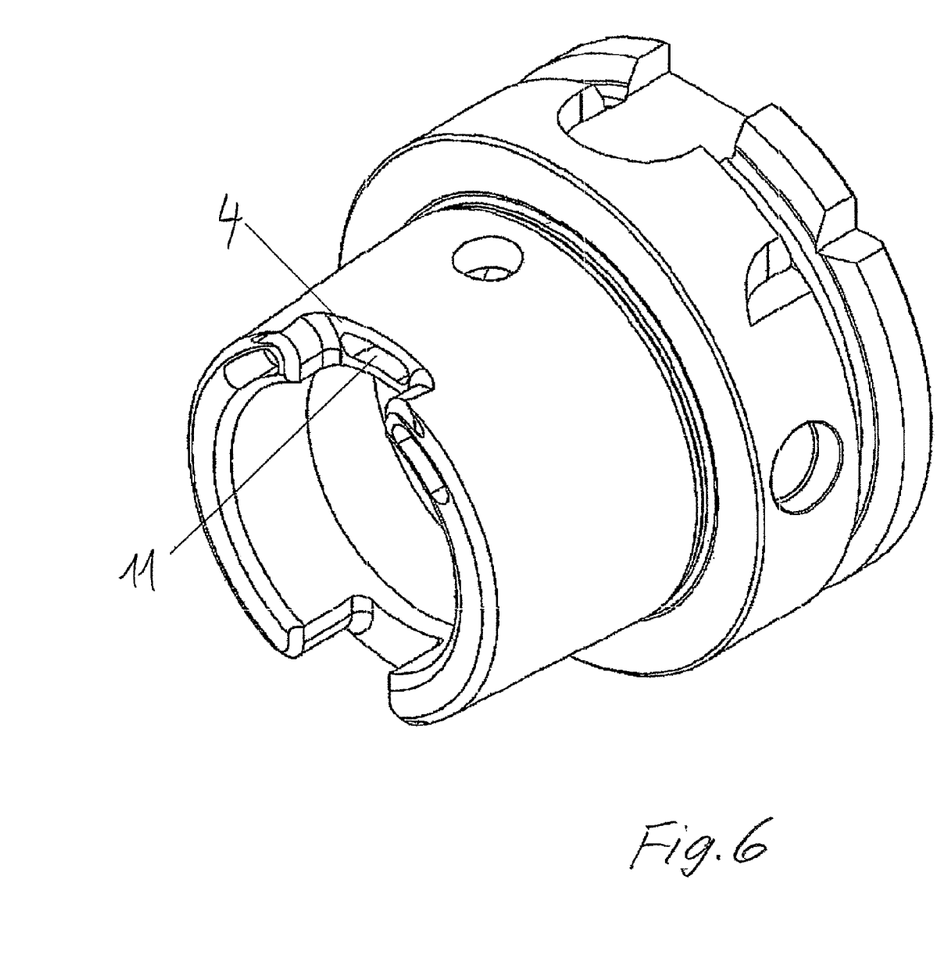

In the embodiment shown in FIG. 5, slots 11 are arranged in the end face 9 instead of bores. FIG. 6 shows the arrangement of additional slots in the recesses 4 themselves.

Figure 7:
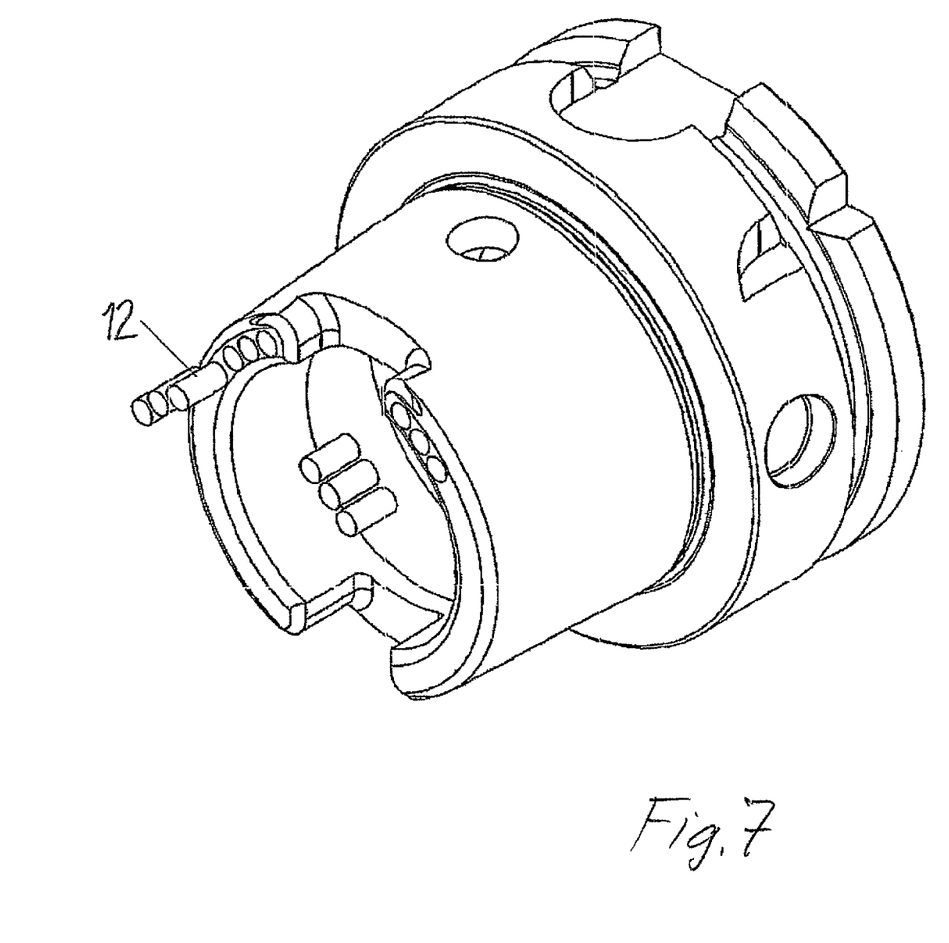
Figure 8:
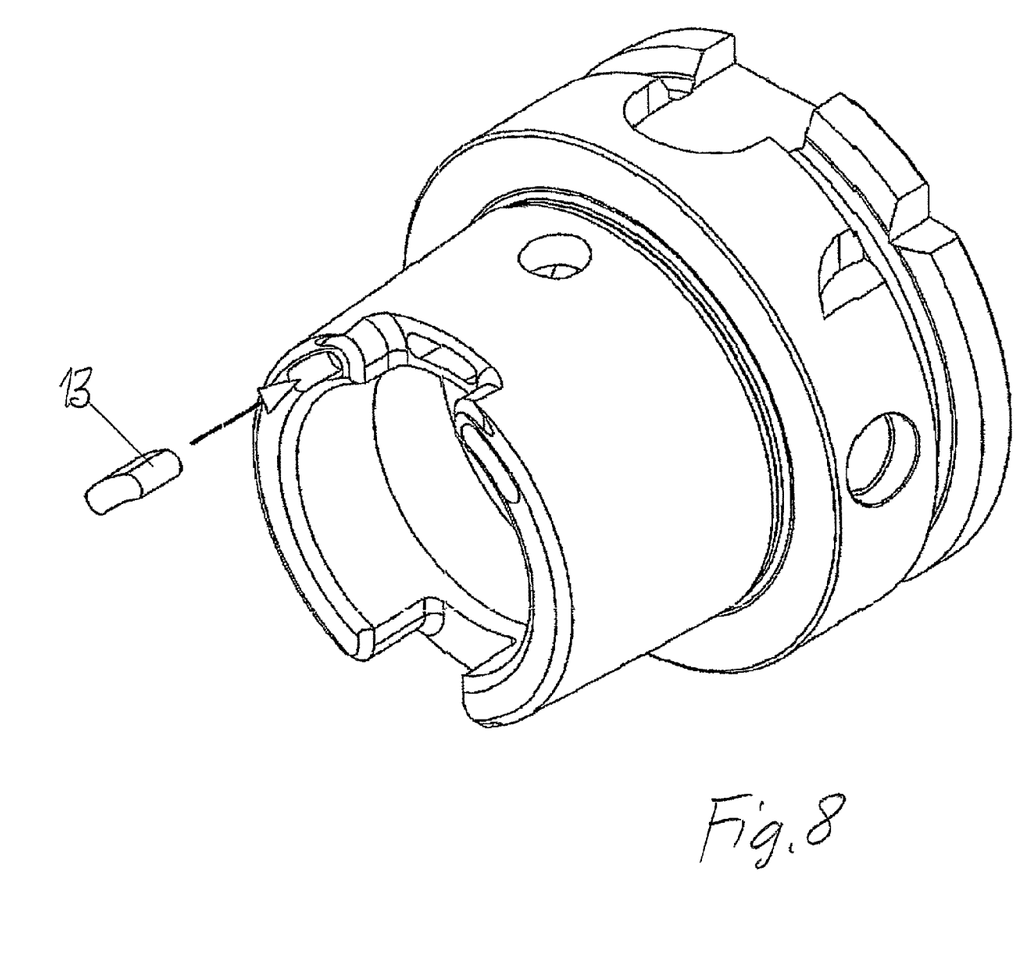

As shown in FIG. 7, the bores 8 can be provided with cylindrical inserts 12. This prevents the penetration of dirt and permits scanning of the surfaces provided with compensation bores for measurement purposes. In order to achieve the compensation effect, the inserts 12 consist of a material of lower density, for example of plastics, light metals or hollow bodies. FIG. 8 shows how slots 11 introduced for compensation are closed with appropriately shaped inserts 13.

The imbalance compensation according to the invention was shown with reference to an HSK tool coupling, but its principle can of course also be readily used in the case of other types of tool couplings.

The invention claimed is:

1. Method for balancing a tool coupling having a first end face at the machine side and a second end face at the tool side of the tool coupling, in which tool coupling for compensating an unbalance measures are taken in two axially distant planes, the measures comprising providing recesses in the end face at the machine side.

2. A tool coupling having a first end face at the machine side and a second end face at the tool side of the tool coupling comprising recesses for compensating an imbalance, the recesses being located in two axially distant planes and the recesses in one of the planes being arranged in said first end face at the machine side.

3. The tool coupling according to claim 2, wherein the recesses are closed by inserts.

4. The tool coupling according to claim 3, wherein the inserts consisting of a material of lower density than the material of the coupling.

* * * * *